(12) United States Patent
Lindbery et al.

(10) Patent No.: US 6,239,583 B1
(45) Date of Patent: May 29, 2001

(54) REGULATION SYSTEM FOR A PERMANENT MAGNET GENERATOR

(75) Inventors: John R. Lindbery, Santa Barbara; Kourosh Mehrayin, Vista, both of CA (US); Jeffrey A. Reichard, West Allis, WI (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 09/307,532

(22) Filed: May 7, 1999

(51) Int. Cl.[7] .................................................. H02P 9/00
(52) U.S. Cl. ................................................ 322/46; 322/44
(58) Field of Search ................................. 322/17, 22, 25, 322/27, 28, 46, 47

(56) References Cited

U.S. PATENT DOCUMENTS

| | | | |
|---|---|---|---|
| 4,379,990 | 4/1983 | Sievers et al. | 322/99 |
| 4,701,692 | * 10/1987 | Takeuchi et al. | 322/90 |
| 4,841,202 | * 6/1989 | Dishner et al. | 318/14 |
| 4,959,605 | 9/1990 | Vaidya et al. | 322/10 |
| 5,077,485 | 12/1991 | Rashid | 307/84 |
| 5,093,611 | 3/1992 | Nakamura et al. | 322/90 |
| 5,260,642 | 11/1993 | Huss | 322/51 |
| 5,309,081 | 5/1994 | Shah et al. | 322/10 |
| 5,486,751 | * 1/1996 | Koenig | 322/86 |
| 5,550,457 | * 8/1996 | Kusase et al. | 322/29 |
| 5,608,616 | * 3/1997 | Umeda et al. | 363/132 |
| 5,625,276 | 4/1997 | Scott et al. | 322/24 |
| 5,705,917 | 1/1998 | Scott et al. | 322/46 |
| 5,942,818 | * 8/1999 | Satoh et al. | 310/46 |
| 5,998,976 | * 12/1999 | Steffan | 322/10 |
| 6,049,195 | * 4/2000 | Geis et al. | 322/46 |
| 6,066,941 | * 5/2000 | French | 322/90 |

\* cited by examiner

Primary Examiner—Nicholas Ponomarenko
(74) Attorney, Agent, or Firm—Haverstock, Garrett & Roberts; W. Bryan McPherson, III

(57) ABSTRACT

A regulation system for a permanent magnet generator for generating electrical power and for supplying the electrical power to a load comprises a switching circuit connected between the permanent magnet generator and the load, the switching circuit being capable of regulating the electrical power being supplied to the load and a control circuit connected to the switching circuit, the control circuit for determining the amount of electrical power being supplied by the permanent magnet generator and for controlling operation of the switching circuit to regulate the electrical power being supplied to the load.

10 Claims, 3 Drawing Sheets

Fig_3_

US 6,239,583 B1

REGULATION SYSTEM FOR A PERMANENT MAGNET GENERATOR

TECHNICAL FIELD

This invention relates generally to electrical power generating systems, and more particularly, to a regulation system for a permanent magnet generator.

BACKGROUND ART

Electric generators, such as permanent magnet generators, are well known types of electrical power generating systems for supplying power to a wide variety of systems. A generator typically includes either a rotor mounted on a rotating shaft and disposed concentrically relative to a stationary stator or a stationary rotor positioned concentrically positioned within a rotating stator. An external energy source, such as a motor, an engine, or a turbine, commonly drives the rotating element. Both the stator and the rotor have a series of poles. The stator or the rotor generates a magnetic field which interacts with the windings on the poles of the other structure. As the magnetic field intercepts the windings, an electrical voltage is generated which is provided to a load. This voltage may also be applied to a bridge rectifier, sometimes regulated, and then provided as an output.

A permanent magnet generator uses permanent magnets to generate the required magnetic field. Permanent magnet generators are typically much lighter and smaller than traditional wound field generators. However, one disadvantage associated with a permanent magnet generator is that it is difficult to control or regulate the power supplied by the permanent magnet generator. For instance, the voltage supplied by the permanent magnet generator can vary significantly according to the speed of the rotor. Changes in the speed of the rotor can occur due to engine speed variations or changes in the load characteristics. Additionally, the voltage of a permanent magnet generator varies inversely with the current delivered. Stated another way, as the current increases the voltage decreases. Variations in the voltage are not acceptable for conventional loads and the voltage must be controlled or regulated.

Accordingly, the present invention is directed to overcome one or more of the problems as set forth above.

DISCLOSURE OF THE INVENTION

In one aspect of the present invention a regulation system for a permanent magnet generator for generating electrical power and for supplying the electrical power to a load is disclosed in which the regulation system comprises a switching circuit connected between the permanent magnet generator and the load, the switching circuit being capable of regulating the electrical power being supplied to the load and a control circuit connected to the switching circuit, the control circuit for determining the amount of electrical power being supplied by the permanent magnet generator and for controlling operation of the switching circuit to regulate the electrical power being supplied to the load.

In another aspect of the present invention a regulation system for a permanent magnet generator is disclosed in which the permanent magnet generator has a pair of windings with each winding having three phases, the windings being displaced from each other by a number of electrical degrees, the permanent magnet generator for generating electrical power and for supplying the electrical power to a load, the regulation system comprises a switching circuit connected between each corresponding phases of each winding, the switching circuit for regulating the electrical power being supplied to the load and a control circuit connected to each of the switching circuits, the control circuit for determining the amount of electrical power being supplied by the permanent magnet generator and for controlling the operation of each of the switching circuits to regulate the electrical power being supplied to the load.

In a further aspect of the present invention a regulation system for a permanent magnet generator for generating voltage and for supplying the voltage to a load comprises a switching circuit connected between the permanent magnet generator and the load, the switching circuit for imposing a lagging power factor on the permanent magnet generator for regulating the voltage being supplied to the load and a control circuit connected to the switching circuit, the control circuit for determining the voltage being supplied by the permanent magnet generator and for controlling operation of the switching circuit to regulate the voltage being supplied to the load.

BEST MODE FOR CARRYING OUT THE INVENTION

Figure 1:
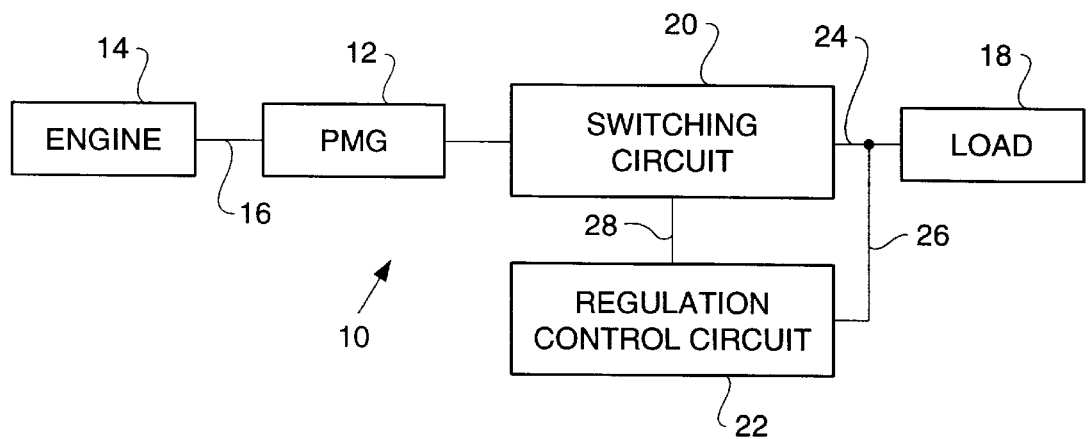
FIG. 1 is a block diagram of a regulation system for a permanent magnet generator constructed according to the present invention.

Referring now to the drawings, in particular FIG. 1, a regulation system 10 for a permanent magnet generator 12 is shown. The regulation system 10 is shown connected to the permanent magnet generator 12 which is in turn connected to an engine 14. The permanent magnet generator 12 receives mechanical power at varying speeds from the engine 14 by a rotating shaft 16. The permanent magnet generator 12 is used to deliver electrical power to a load 18. The regulation system 10 is connected between the permanent magnet generator 12 and the load 18. The regulation system 10 comprises a control or switching circuit 20 and a regulation control circuit 22. The regulation control circuit 22 is connected to an output 24 of the switching circuit 20 by a connection 26 and this connection 26 allows the regulation control circuit 22 to monitor or sense the voltage or current of the output 24. The regulation control circuit 22 is also connected to the switching circuit 20 via an interface 28. In this manner the voltage regulation control circuit 22 can control the operation of the switching circuit 20 to regulate the electrical power, such as the voltage or the current, being supplied to the load 18.

Figure 2:
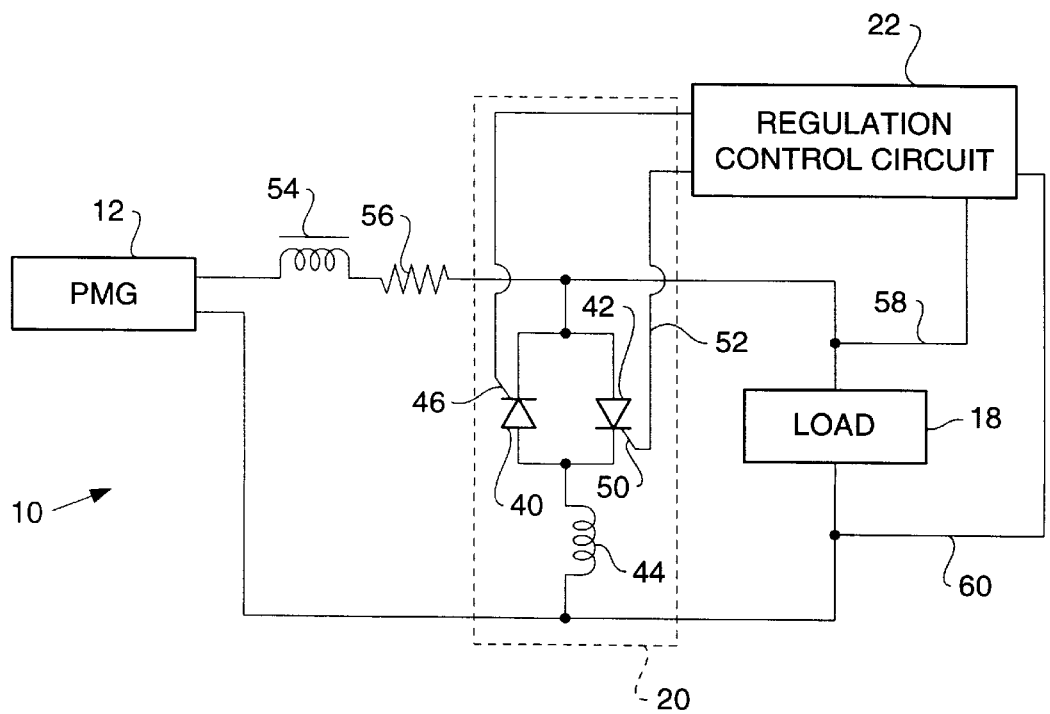
FIG. 2 is a schematic diagram of the regulation system for a permanent magnet generator.

Referring now to FIG. 2, a more detailed schematic diagram of the regulation system 10 is illustrated. The switching circuit 20 is shown connected to one phase of the permanent magnet generator 12. Only one phase is depicted in FIG. 2 for the sake of simplicity. The switching circuit 20 is shown to comprise a pair of silicon controlled rectifiers (SCR's) 40 and 42 connected to an inductor 44. The SCR 40 has a gate 46 which is connected to the regulation control circuit 22 via a lead 48. The other SCR 42 also has a gate 50 connected to the regulation control circuit 22 by a lead 52. The SCR's 40 and 42 are operated, such as by activation or deactivation, by having signals being applied to the gates 46 and 50 and these signals control the switching time of the SCR's 40 and 42. The inductor 44 is used to provide reactance for the switching circuit 20. The permanent magnet generator 12 is also shown to include internal reactance associated with a stator winding (not shown) of the permanent magnet generator 12 which includes an inductor 54 and a resistor 56. The regulation control circuit 22 is connected to the load 18 by a pair of leads 58 and 60. The voltage regulation control circuit 22 is connected to the load 18 to monitor either the voltage or the current provided to the load 18.

Although SCR's 40 and 42 are shown as part of the control or switching circuit 20 it is also possible and contemplated to have other type control or switching elements. For example, GTO's (gate turn off), IGBT's (insulated gate bipolar transistor), IGCT's (integrated gate commutated thyristor), saturable reactors, and magnetic amplifiers may also be used as the control or switching elements within the switching circuit 20. Such other elements would also be connected to and controlled by the regulation control circuit 22. Additionally, the regulation control circuit 22 may be a microprocessor based device or system which is capable of receiving inputs, such as the voltage and/or current being provided from the permanent magnet generator 12 to the load 18, and determining based upon the inputs whether the switching circuit needs to be activated or deactivated. The regulation control circuit 22 may also include discrete components or be constructed of hard wired logic components.

The regulation system 10 operates in the following manner. The regulation control circuit 22 monitors or senses the voltage or the current provided to the load 18. The regulation control circuit 22 may have as an input a user adjustable setpoint such as a predetermined voltage level or current level, or a range of values, or a dynamically determined value. The regulation control circuit 22 compares the monitored voltage or current level against the setpoint value to determine whether the SCR's 40 and 42 need to be activated or deactivated. For example, if it is determined that the sensed voltage level is above the setpoint value then the SCR's 40 and 42 will be activated to reduce the AC voltage of the permanent magnet generator 12. The SCR's 40 and 42 may have their switching times controlled by the voltage regulation control circuit 22. In this manner, the output of the permanent magnet generator 12 or the electrical power or electricity supplied by the permanent magnet generator 12 to the load 18 may be reduced by imposing a lagging power factor on the permanent magnet generator 12. Additionally, the AC output of the permanent magnet generator 12, which is in the form of a sine wave, is clipped by the activation of the SCR's 40 and 42 which lowers the peak of the sine wave and lowers the voltage being supplied to the load 18.

Figure 3:
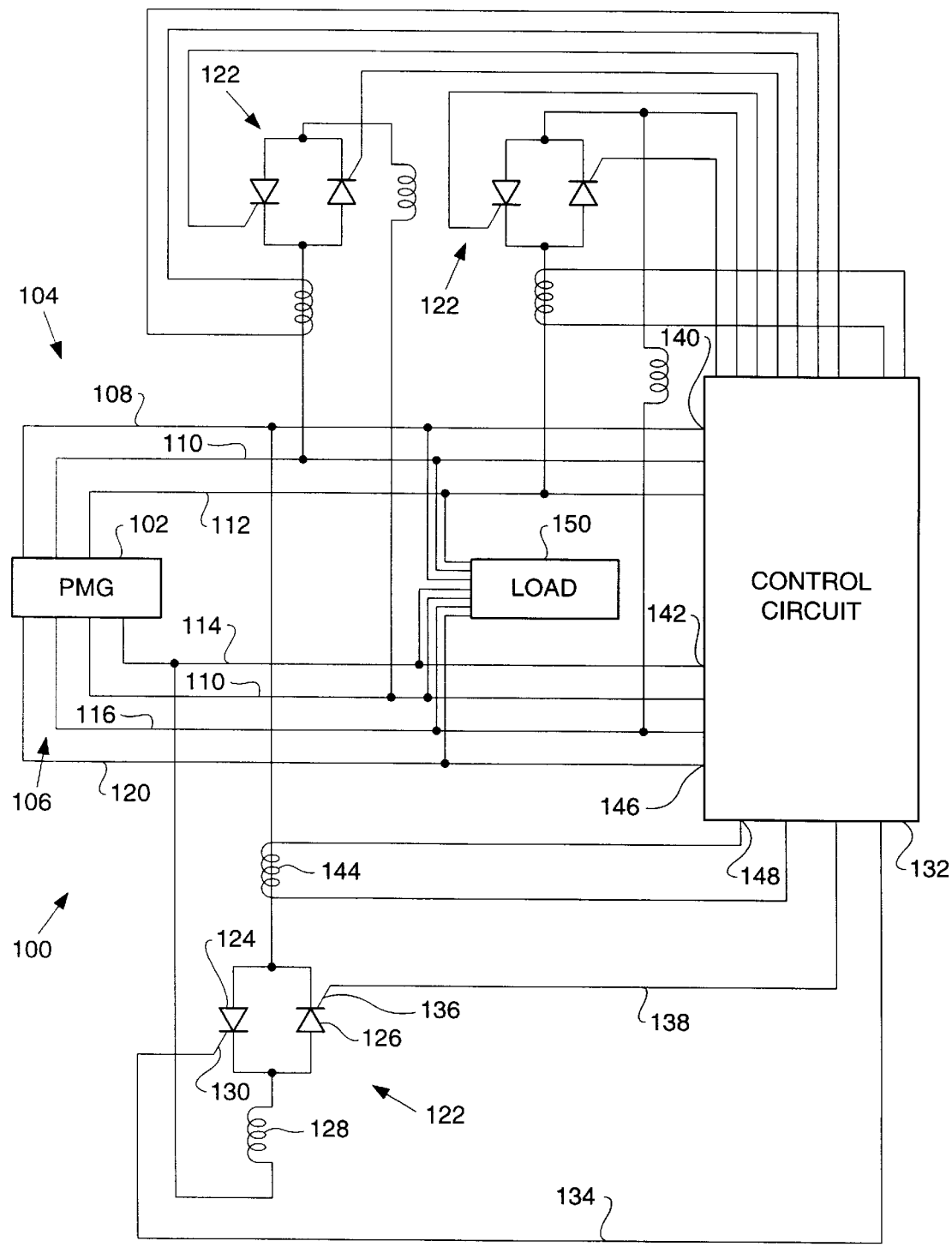
FIG. 3 is a schematic diagram of the regulation system for a permanent magnet generator.

Referring now to FIG. 3, another embodiment of a regulation system 100 is shown. The regulation system 100 is used to control the electrical power, such as the voltage, being supplied by a permanent magnet generator 102 having a pair of windings 104 and 106. The winding 104 has three phases 108, 110, 112 and the winding 106 has three phases 114, 116, and 118. The phase 108 corresponds to the phase 114, phase 110 corresponds to phase 116, and phase 112 corresponds to phase 118. The permanent magnet generator 102 also has a neutral 120. The winding 104 is displaced from the other winding 106 by a number of electrical degrees, such as for example 30 electrical degrees. In particular, corresponding phases 108 and 114 are out of phase by 30 degrees, corresponding phases 110 and 116 are out of phase by 30 degrees, and corresponding phases 112 and 118 are out of phase by 30 degrees.

The regulation system 100 includes a switching circuit 122 connected between the phases 108 and 114 of the windings 104 and 106. The switching circuit 122 comprises a pair of SCR's 124 and 126 and an inductor 128. The SCR 124 has a gate 130 which is connected to a control circuit 132 via a lead 134. Additionally, the SCR 126 has a gate 136 which is connected to the control circuit 132 by a lead 138. The control circuit 132 is capable of sensing the AC voltages of the phases 108 and 114 at inputs 140 and 142, respectively. An external current transformer 144 is used to sense the current through the switching circuit 122. The current transformer 144 is connected to the control circuit 132 at a pair of inputs 146 and 148. The permanent magnet generator 102 is also connected to a load 150.

The control circuit 132 is capable of monitoring the voltages and the currents in all of the phases 108–118. Based upon the monitored voltages and currents, the control circuit 132 controls the switching times of the SCR's 124 and 126. For example, the switching times of the SCR's 124 and 126 are controlled to reduce the AC voltage of the generator 102 based upon a preselected setpoint. The other phases 110 and 116 and 112 and 118 also have a switching circuit 122 connected between them in a similar manner as the corresponding phases 108 and 114. Additionally, the control circuit 132 monitors the voltages and the currents from the other phases 110, 112, 116, and 118 of the permanent magnet generator 102 in order to control operation of the switching circuits 122 associated with the phases 110, 112, 116, and 118.

In operation, the control circuit 132 monitors the voltages at the inputs 140 and 142 and the current at the transformer 144 connected at the inputs 146 and 148. If it is determined that the voltage is above a predetermined voltage then the control circuit 132 will send signals out over the leads 130 and 138 to control the switching times of the SCR's 124 and 126 to reduce the AC voltage of the permanent magnet generator 102. The output of the permanent magnet generator 102 has imposed on it a lagging power factor. As discussed above, if the permanent magnet generator 102 has a sine wave output, the peak of the sine wave will be clipped which reduces the AC output of the permanent magnet generator 102.

As pointed out above, although SCR's 124 and 126 are shown as part of the switching circuit 122 it is also possible to use other type control or switching elements. For example, GTO's, IGBT's, IGCT's, saturable reactors, and magnetic amplifiers and/or equivalents thereof may be used as the control or switching elements within the switching circuit 122. Such other elements would also be connected to and controlled by the control circuit 132. The control circuit 132 may be a microprocessor based device or circuit which is capable of receiving inputs, such as the voltage at the inputs 140 and 142 and/or the current at the inputs 146 and 148, and determining based upon the inputs whether the switching circuit 122 needs to be activated or deactivated.

Figure 4:
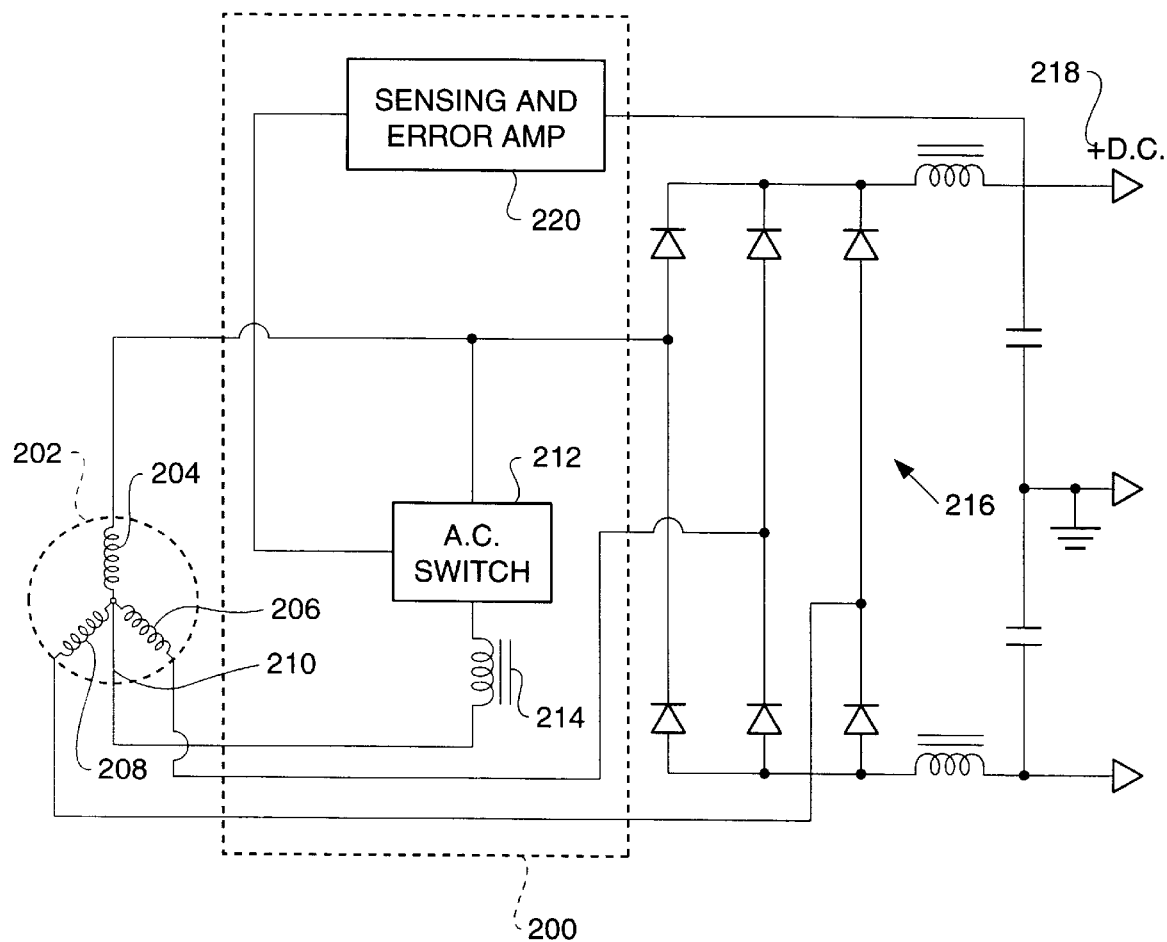
FIG. 4 is a schematic diagram of another preferred embodiment of a regulation system for a permanent magnet generator.

With reference now to FIG. 4, another preferred embodiment of a regulation system 200 is illustrated. The regulation system 200 is connected to a permanent magnet generator 202 and is used to control the direct current (D.C.) link voltage. The permanent magnet generator 202 includes three stator windings 204, 206, and 208 and a neutral 210. The winding 204 is connected to an alternating current (A.C.)

switch 212 and the neutral 210 is connected to the A.C. switch 212 through an inductor 214. The winding 204 is also connected to a rectifying circuit 216 which rectifies the A.C. output of the permanent magnet generator 202 to a D.C. output 218. The D.C. output 218 is provided to a load which is not shown.

A sensing and error amp circuit 220 is connected between the D.C. output 218 and the A.C. switch 212. The sensing and error amp circuit 220 senses or monitors the D.C. output 218 and determines whether the A.C. switch 212 needs to be activated or deactivated. In this manner, the regulation system 200 is capable of providing a regulated D.C. output voltage at the D.C. output 218. The control system 200 is only shown connected to the winding 204 or one phase of the permanent magnet generator 202 for the sake of clarity. It is to be understood that other A.C. switches, such as the A.C. switch 212, are connected between the windings 206 and 208 and the sensing and error amp 220.

Industrial Applicability

The regulation system of the present invention controls or regulates the output voltage of a permanent magnet generator by taking advantage of an inherent weakness of a permanent magnet generator. The weakness being the inability to maintain a constant output voltage when presented with various load conditions such as lagging or leading power factor loads. By varying the effective power factor applied to the generator it is possible to vary the terminal voltage in a manner that allows the maintenance of a near constant terminal voltage under various conditions of loading, temperature, and a limited range of shaft speeds or any combination thereof.

In addition to power factor control it is possible to control the terminal voltage by peak clipping of the terminal voltage. Peak clipping is particularly useful where the permanent magnet generator output is to be rectified and control of the resultant D.C. voltage is the objective. Peak clipping lowers the output voltage of the permanent magnet generator. Peak clipping also employs the inherent inductance and resistance of the armature reaction characteristics of the permanent magnet generator to drop the terminal voltage of the permanent magnet generator.

The regulation system is efficient in operation and may be used with a permanent magnet generator which has the ability to support the maximum rated load with the rated terminal voltage. The regulation system is also capable of rapid response in the order of a half cycle of the permanent magnet generator's output frequency due to there being no large field inductance as would be found in a conventional wound field machine or generator.

Other aspects, objects and advantages of the present invention can be obtained from a study of the drawings, the disclosure and the appended claims.

What is claimed is:

1. A regulation system for a permanent magnet generator for generating electrical power and for supplying the electrical power to a load, the regulation system comprising:

a switching circuit connected in parallel with the permanent magnet generator, the switching circuit configured to impose a lagging power factor on the permanent magnet generator for regulating the electrical power being supplied to the load; and a control circuit connected to the switching circuit, the control circuit for determining the amount of electrical power being supplied by the permanent magnet generator and for controlling operation of the switching circuit to regulate the electrical power being supplied to the load.

2. The regulation system of claim 1 wherein the switching circuit includes a pair of silicon controlled rectifiers (SCR's) connected between the permanent magnet generator and the load, the SCR's being selectively activated and deactivated for reducing the electrical power being supplied to the load.

3. The regulation system of claim 2 wherein the switching circuit further includes an inductor connected in series with the SCR's.

4. The regulation system of claim 1 wherein the switching circuit includes a pair of SCR's connected between the permanent magnet generator and the load, the SCR's each having switching times and the switching times being controlled by the control circuit to reduce the electrical power being supplied to the load.

5. The regulation system of claim 4 wherein the switching circuit further includes an inductor connected to the SCR's.

6. The regulation system of claim 1 wherein the control circuit is also connected to the load for determining an amount of electrical power being supplied to the load.

7. The regulation system of claim 1 wherein the switching circuit includes a pair of SCR's connected between the permanent magnet generator and the load, the SCR's each including a gate with each gate being connected to the control circuit for activating or deactivating each of the SCR's through each gate.

8. A method for regulating electrical power generated by a permanent magnet generator, the electrical power being supplied to a load with a switching circuit being connected in parallel with the permanent magnet generator and a control circuit being connected to the switching circuit, the method comprising the steps of:

determining the amount of electrical power being supplied by the permanent magnet generator; and controlling the operation of the switching circuit to impose a lagging power factor on the permanent magnet generator for regulating the electrical power being supplied to the load.

9. The method of claim 8 wherein the step of controlling the operation of the switching circuit includes the step of reducing the electrical power being supplied to the load by activating and deactivating a pair of SCR's located within the switching circuit.

10. The method of claim 8 wherein the step of controlling the operation of the switching circuit includes the step of reducing the electrical power being supplied to the load by controlling the switching times of a pair of SCR's located within the switching circuit.

* * * * *